(12) United States Patent
Sugiura et al.

(10) Patent No.: US 7,301,245 B2
(45) Date of Patent: Nov. 27, 2007

(54) CONTROL SYSTEM FOR A VEHICLE POWER SUPPLY AND CONTROL METHOD THEREOF

(75) Inventors: Masanori Sugiura, Toyota (JP); Hiroshi Tsujii, Mishima (JP); Ken Kuretake, Mishima (JP); Hideto Hanada, Yokohama (JP); Takashi Kawai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 416 days.

(21) Appl. No.: 10/347,703

(22) Filed: Jan. 22, 2003

(65) Prior Publication Data

US 2003/0141123 A1    Jul. 31, 2003

(30) Foreign Application Priority Data

Jan. 30, 2002   (JP) ............................. 2002-022205

(51) Int. Cl.
   *B60L 1/14*   (2006.01)
(52) U.S. Cl. ................. 307/10.1; 322/28; 180/65.4
(58) Field of Classification Search ............... 180/65.4; 307/45, 10.1, 75, 85; 320/104; 290/40 C; 322/28
   See application file for complete search history.

(56) References Cited

U.S. PATENT DOCUMENTS

| | | | |
|---|---|---|---|
| 4,923,025 A | | 5/1990 | Ellers |
| 5,318,142 A | * | 6/1994 | Bates et al. ............... 180/65.2 |
| 5,513,718 A | * | 5/1996 | Suzuki et al. ............. 180/65.2 |
| 5,550,445 A | | 8/1996 | Nii |
| 5,796,175 A | * | 8/1998 | Itoh et al. .................. 307/10.1 |
| 5,818,115 A | * | 10/1998 | Nagao ........................... 290/31 |
| 5,823,280 A | | 10/1998 | Lateur et al. |
| 5,898,282 A | | 4/1999 | Drozdz et al. |
| 5,942,879 A | | 8/1999 | Ibaraki |
| 6,208,931 B1 | | 3/2001 | Schoettle et al. |
| 2002/0158513 A1 | * | 10/2002 | Amano et al. ............. 307/10.6 |

FOREIGN PATENT DOCUMENTS

| | | |
|---|---|---|
| CN | 2396511 Y | 9/2000 |
| CN | 1079056 C | 2/2002 |
| EP | 0 917 978 A2 | 5/1999 |
| JP | A-07-236203 | 9/1995 |
| JP | A 09-163505 | 6/1997 |
| JP | A 2000-156919 | 6/2000 |
| JP | A-2002-224709 | 8/2000 |
| JP | A 2000-324614 | 11/2000 |
| WO | WO 93/23263 | 11/1993 |

* cited by examiner

*Primary Examiner*—Michael Sherry
*Assistant Examiner*—Daniel Cavallari
(74) *Attorney, Agent, or Firm*—Oliff & Berridge, PLC

(57) ABSTRACT

A control system for a vehicle power supply for supplying power to a predetermined power receiving portion includes a first power generating power supply portion, second power generating power supply portion, and controller. The controller is arranged to set the voltage to be output to the power receiving portion from one of the power generating power supply portions in accordance with the output voltage of the other of the power generating power supply portions. With this arrangement, the power receiving portion is prevented from being supplied with an excessive amount of power, and when power regeneration is being performed by the second power generating power supply portion, the regenerated power is effectively used. Thus, the fuel economy of the vehicle can be increased.

4 Claims, 8 Drawing Sheets

CONTROL SYSTEM FOR A VEHICLE POWER SUPPLY AND CONTROL METHOD THEREOF

INCORPORATION BY REFERENCE

The disclosure of Japanese Patent Application No. 2002-022205 filed on Jan. 30, 2002, including the specification, drawings and abstract is incorporated herein by reference in its entirety.

BACKGROUND OF THE INVENTION

1. Field of Invention

The invention relates to a control system for controlling a power supply of a vehicle, especially for controlling a plurality of power supply portions of a vehicle, and a control method thereof.

2. Description of Related Art

In a vehicle, generally, a power storage device and power generator are provided and together serve as a power supply for supplying power to a variety of electric devices of the vehicle. The power generator is normally driven by an internal combustion engine as a driving power source of the vehicle. Recently, however, it has been strongly demanded to improve the fuel economy mainly for the purpose of reducing exhaust gas emitted from the vehicle. In response to such a demand, it is attempted to regenerate power from kinetic energy of the vehicle and store the regenerated power in the power storage device.

One of typical examples of such a vehicle is a so-called "hybrid vehicle" which includes an internal combustion engine and motor-generator as its driving power sources. A vehicle of this type is adapted to start moving (take off) only using the motor-generator in a certain operating state thereof, and it is therefore required that a power supply of the vehicle is capable of outputting a large amount of power in a moment. For this reason, a capacitor that stores power in the form of static electricity is used as a power supply for the motor-generator and as a power storage device for storing the power regenerated by the motor-generator.

Moreover, there has recently been developed a vehicle which performs a so-called economy running operation. In this operation, idling of the engine is stopped when the vehicle pulls over (temporarily stops) and the engine is automatically restarted when the conditions for defining the stopped state of the vehicle become unsatisfied. Thus, the total time for the engine idling is reduced, which leads to a reduction in the amount of exhaust gas emitted from the vehicle and to an improvement of the fuel economy.

In such "an economy-running vehicle", a large amount of power is required for restarting the engine immediately. Therefore, a capacitor capable of discharging a large amount of power in a moment is used as a power supply for an engine starter instead of a conventional battery, and also a power regenerator for generating power for charging the capacitor may be provided together with the capacitor.

As disclosed in Japanese Laid-open Patent Publication No. 2000-156919, it is known that a capacitor that has a high power storage voltage and is capable of discharging a large amount of power in a short time is arranged such that the power from by the capacitor is supplied to a battery to charge it. Such an arrangement makes it less necessary to drive an alternator by an engine for charging the battery, and the quantity of fuel applied to the alternator is reduced, whereby the fuel economy improves.

It is true that the fuel economy improves when power regeneration is performed using the capacitor and power regenerator as described in the above publication. However, it is considered that the regenerated power is not effectively used in many cases, and therefore further improvements are obviously necessary for enabling a more effective use of the regenerated power.

In the case what the capacitor is used for charging the battery as described in the above publication, it is necessary to stop charging the battery by the alternator before the battery is fully charged, so that the battery can always receive the power supplied from the capacitor. However, since the power stored in the capacitor is obtained by performing power regeneration and is therefore not always available, the charged capacity of the battery may be short when discharging power therefrom. If the battery is always kept fully charged using the power generated by the alternator in order to avoid such a power shortage, it may happen that the power from the capacitor can not be received by the battery, the battery is excessively charged due to increased output voltage of the capacitor, or an electric load connected to the battery wastefully consumes excessive amount of power.

By the way, when a power regenerator and capacitor are provided in a vehicle as described above, it means that the vehicle has two power supply portions; a first power supply portion constituted by an alternator or by an alternator and battery, and second power supply portion constituted by a power regenerator or by a power regenerator and capacitor. Considering the fact that the second power supply portion for power regeneration can be effectively used for improving the fuel economy but can hardly be "a stable power supply", it is preferable that the power regenerated by the second power supply portion is first used and the power generated by the alternator or stored in the battery is used when the regenerated power becomes insufficient.

For doing this, it is necessary to switch from one of the power supplies to the other while supplying power to the electric load. In order to enable such a switching between the power supplies, for example, the alternator is adapted to start supplying power when the power that is currently being supplied from the capacitor to a certain electric load reduces. In this case, almost no torque is applied to the alternator when power is being supplied from the capacitor, and a certain level of torque is applied to the alternator when the alternator is substantially connected to the electric load to start generating power. At this time, if the electric load is large, large torque is suddenly applied to the alternator, which may cause a slippage of a belt connecting an internal combustion engine and the alternator, and such a belt slippage may sometime produce a noise and may reduce the durability of the belt.

If power is gradually generated by the alternator to avoid such a problem, the output voltage of the alternator may still be low when the power supply from the capacitor is cut off. Such a reduction in the power supplied to the electric load may cause a momentary change in its operating state, such as a momentary reduction in the luminance of a light, which may lead to an unpleasant feeling of passengers.

SUMMARY OF THE INVENTION

In view of the above problems, the invention has been made to provide a control system which allows an effective use of power supplied from a plurality of power generating power supply portions of a vehicle.

To achieve the above object, a control system according to one exemplary embodiment of the invention controls the output voltage of one of a plurality of power generating power supply portions relative to the output voltage of other power generating power supply portion or portions. More specifically, the control system includes a first power generating power supply portion, a second power generating power supply portion, and a controller which sets a voltage to be output from one of the power generating power supply portions to the power receiving portion in accordance with an output voltage of the other of the power generating power supply portions.

According to one exemplary embodiment of the invention, a control method of a control system which includes a first power generating power supply portion and second power generating power supply portion and supplies power to a predetermined power receiving portion from the respective power generating power supply portions is provide. The control method includes the steps of detecting the output voltage of the first power generating power supply portion; detecting the output voltage of the second power generating power supply portion; and setting the voltage to be output from one of the power generating power supply portions to the power receiving portion in accordance with the output voltage of the other of the power generating power supply portions.

According to the above-described control system and control method, the output voltage of one power generating power supply portion is set in accordance with the output voltage of the other power generating power supply portion. At this time, for example, the voltage of the one power generating power supply portion is set to voltage that is lower than the output voltage of the other power generating power supply portion, so that the power receiving portion is prevented in advance from being supplied with an excessive amount of power and wasteful use of power is thereby avoided.

BRIEF DESCRIPTION OF THE DRAWINGS

The above mentioned embodiment and other embodiments, objects, features, advantages, technical and industrial significances of this invention will be better understood by reading the following detailed description of the exemplary embodiments of the invention, when considered in connection with the accompanying drawings, in which.

DETAILED DESCRIPTION OF PREFERRED EMBODIMENTS

In the following description and the accompanying drawings, the present invention will be described in more detail in terms of exemplary embodiments.

Figure 8:
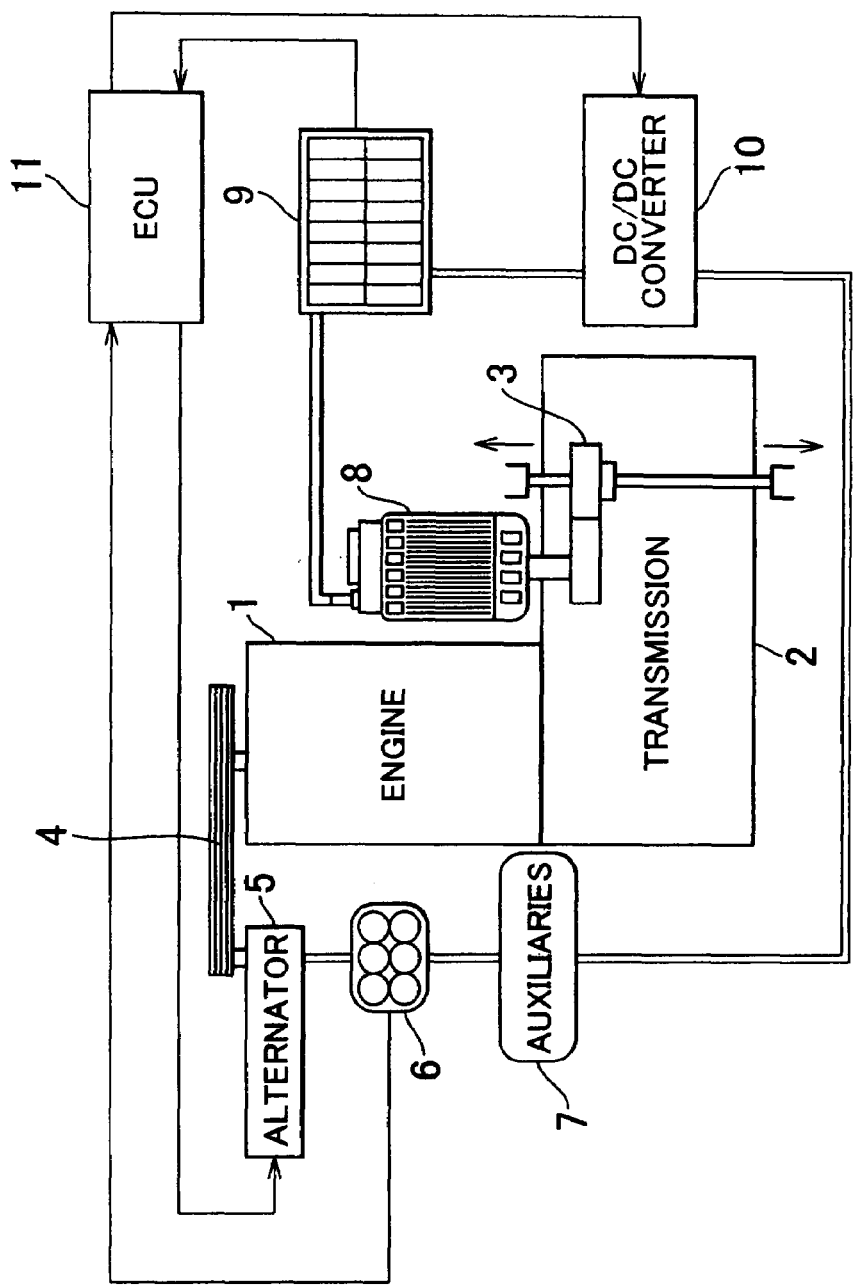
FIG. 8 is a view schematically showing the construction of a vehicle power supply system including a vehicle power supply control system according to an exemplary embodiment of the invention.

To begin with, the construction of a vehicle including a control system according to the invention will be described with reference to FIG. 8. As shown in FIG. 8, a transmission 2 is connected to an output side of an internal combustion engine (will hereinafter be referred to as "engine") 1, and torque is output from the transmission 2 to right and left wheels (not shown) via a differential gear 3.

The engine 1 is a power plant, such as a gasoline engine, diesel engine, and natural gas engine, which generates torque by combusting fuel. An output shaft (a crankshaft) of the engine 1 is connected to an alternator 5 serving a first power generator via a belt 4. The alternator 5 is able to adjust its output voltage as needed. The power generated by the alternator 5 is stored in a battery (e.g., a battery having charging voltage of 12V) 6 which is constituted by a lead acid battery or the like.

The battery 6 acts as an electric load when it is used for storing power, while it constitutes a first power generating power supply portion together with the alternator 5 when it is used for supplying power. The battery 6 is connected to auxiliaries 7 (electric load), such as fans of an air-conditioning system, lights, starter motor, wipers, motors for driving seats, windows, and so on.

The transmission 2 may be a transmission of any type, such as a manual or automatic transmission including multiple speed gears and so-called CVT (Continuously Variable Transmission) enabling a stepless speed change. Driving power is transmitted to the differential gear 3 via an output member of the transmission 2. The transmission 2 is able to set "neutral mode" in which the power transmission line from the engine 1 to the differential gear 3 is cut off. A power regenerator 8 is coupled with a rotation member which is arranged such that torque can be transmitted between the rotation member and driven wheels even in the neutral mode. This mechanism including the rotation member corresponds to "a transmission mechanism."

The power regenerator 8 is arranged to generate power by being driven by an external force. More specifically, the power regenerator 8 performs power regeneration by converting a portion of the kinetic energy of the vehicle into electric power when the vehicle is running by an inertial force, as well as power generation using a portion of driving force of the engine 1 when the vehicle is running by the engine 1. The AC power thus generated by the power regenerator 8 is converted into DC power by an inverter (now shown) and then is stored in a capacitor 9.

The capacitor 9 is a power storage device which stores power in the form of static electricity, and is therefore capable of charging and discharging a larger amount of power in a short time as compared to conventional power storage devices, like lead-acid batteries. The capacitor 9 is, for example, adapted to store power at voltage of 0 to 40V.

A DC-DC converter 10 is provided for controlling the discharging capacity of the capacitor 9, and power is selectively supplied from the DC-DC converter 10 to the electric load 7.

That is, the power regenerator 8, the capacitor 9, and the DC-DC converter 10 constitute "a second power generating power supply portion." Thus, the control system according to the embodiment includes a plurality of power supply portions for supplying power to the electric load 7, namely two power supply potions; a first power generating power supply portion constituted by the alternator 5 or the alternator 5 and battery 6 and the second power generating power supply portion constructed as described above.

The control system of the embodiment is also provided with an ECU (Electronic Control Unit) 11 for controlling the power generation and output voltage of the alternator 5 and the power discharging amount and output voltage of the DC-DC converter 10 which correspond to those of the second power generating power supply portion. The ECU 11 includes a microcomputer as its main component, and is arranged to receive control data indicative of the charging voltage and charged state of the capacitor 9 and the charged state of the battery 6, and outputs control command signals for controlling the DC-DC converter 10, the alternator 5, the power regenerator 8, inverter and other components.

The vehicle, as described above, is provided with the plurality of power supplies for supplying power to the electric load 7. Although higher voltage can be obtained with the second power generating power supply portion as compared to the first power generating power supply portion, the stability in supplying power by the second power generating power supply portion is lower than by the first power generating power supply portion. Therefore, the control system of the embodiment controls the respective power generating power supply portions as described later, in order to enable an effective use of power and to thereby improve the fuel economy.

Figure 1:
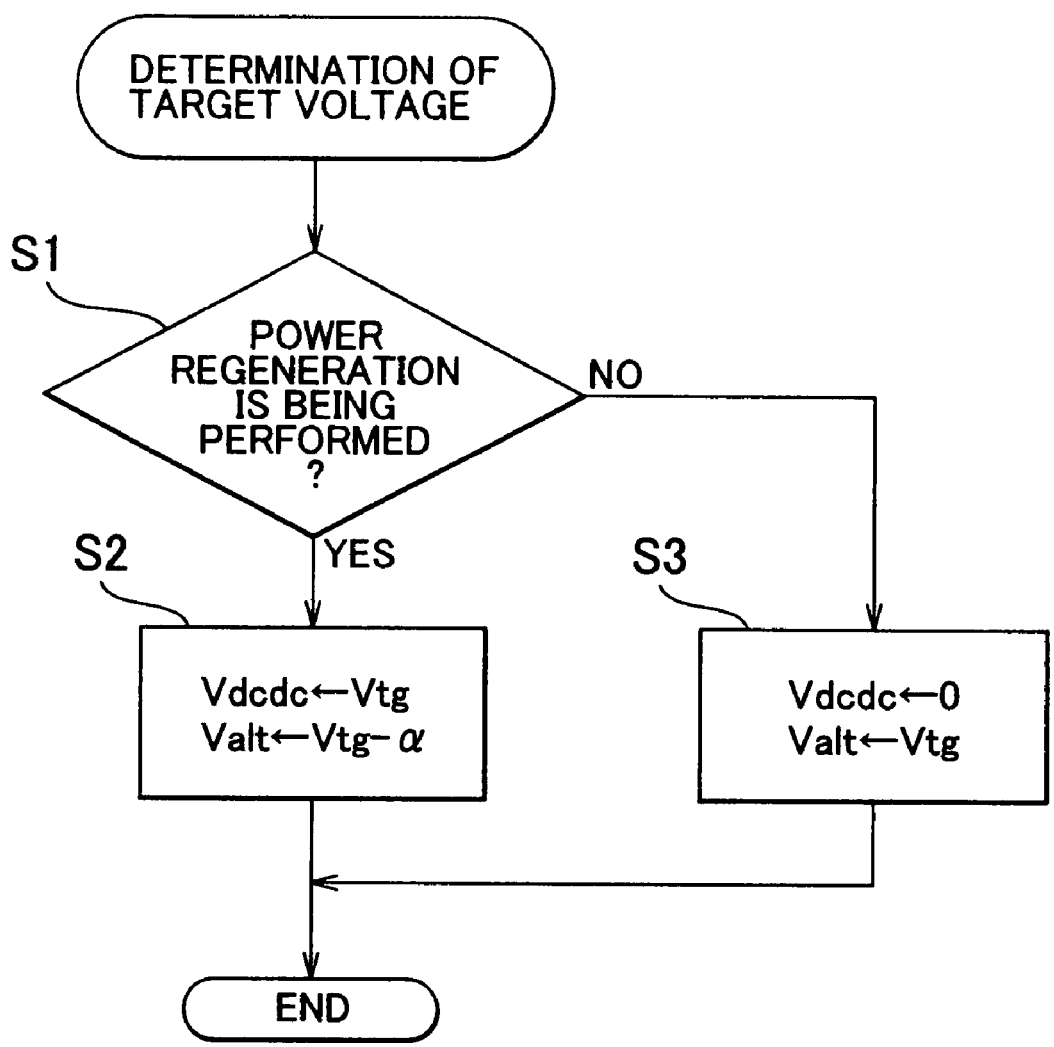
FIG. 1 is a flowchart of a procedure for determining target voltage in one example of a control performed by a control system according to an exemplary embodiment of the invention.
Figure 3:
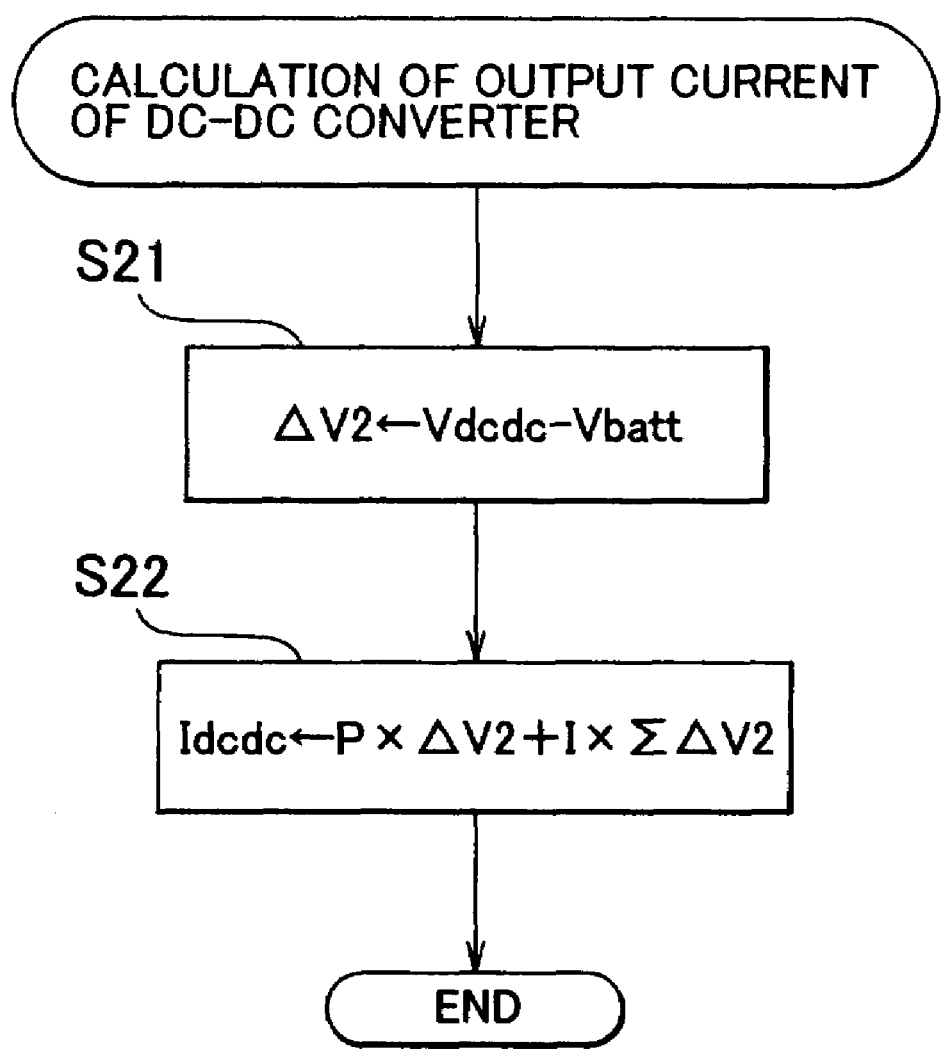
FIG. 3 is a flowchart of a procedure for calculating generated power current of a DC-DC converter in the control performed by the control system according to an exemplary embodiment of the invention.

FIGS. 1 and 3 schematically shows one example of a control performed for charging the battery 6. Meanwhile, since the battery 6 is connected to the auxiliaries, the battery 6 and auxiliaries, when the battery 6 is being charged, together act as the electric load 7.

FIG. 1 is a flowchart of a procedure for determining a target voltage. In this procedure, it is first determined whether power regeneration is being performed (step S1). Since the vehicle includes the alternator 5 for generating power using the driving force of the engine 1, power generation by the power regenerator 8 is only performed at the time of decelerating the vehicle, and so on. Thus, whether power regeneration is being performed can be determined on the basis of operating conditions of the vehicle, such as accelerator opening, vehicle speed, and the like.

When it is determined in the step S1 that power regeneration is being performed, a target voltage Vdcdc of the DC-DC converter 10 is set equal to a target charging voltage Vtg of the battery 6, and a target generated power voltage Valt of the alternator 5 is set to a voltage (Vtg−α) which is lower than the target charging voltage Vtg of the battery 6 by a predetermined value α (step S2). Thus, the voltage of one of the power generating power supply portion is set in accordance with that of the other.

At this time, for example, if a battery whose charging voltage is 12V is used as the battery 6 as aforementioned, the target charging voltage Vtg is set to 12V. The predetermined value α is a small value (e.g., 0.1 to 0.2V) which does not cause changes in the operating state of the electric load 7. For example, if the voltage is reduced by the predetermined value α and it causes a reduction in the luminance of a light, the change in the luminance is smaller than passenger can notice.

In the meantime, when "NO" is obtained in the step S1, namely when power regeneration is not being performed, the target voltage Vdcdc of the DC-DC converter 10 is set to 0V and the target generated power voltage Valt of the alternator 5 is set equal to the target charging voltage Vtg of the battery 6 (step S3).

Figure 2:
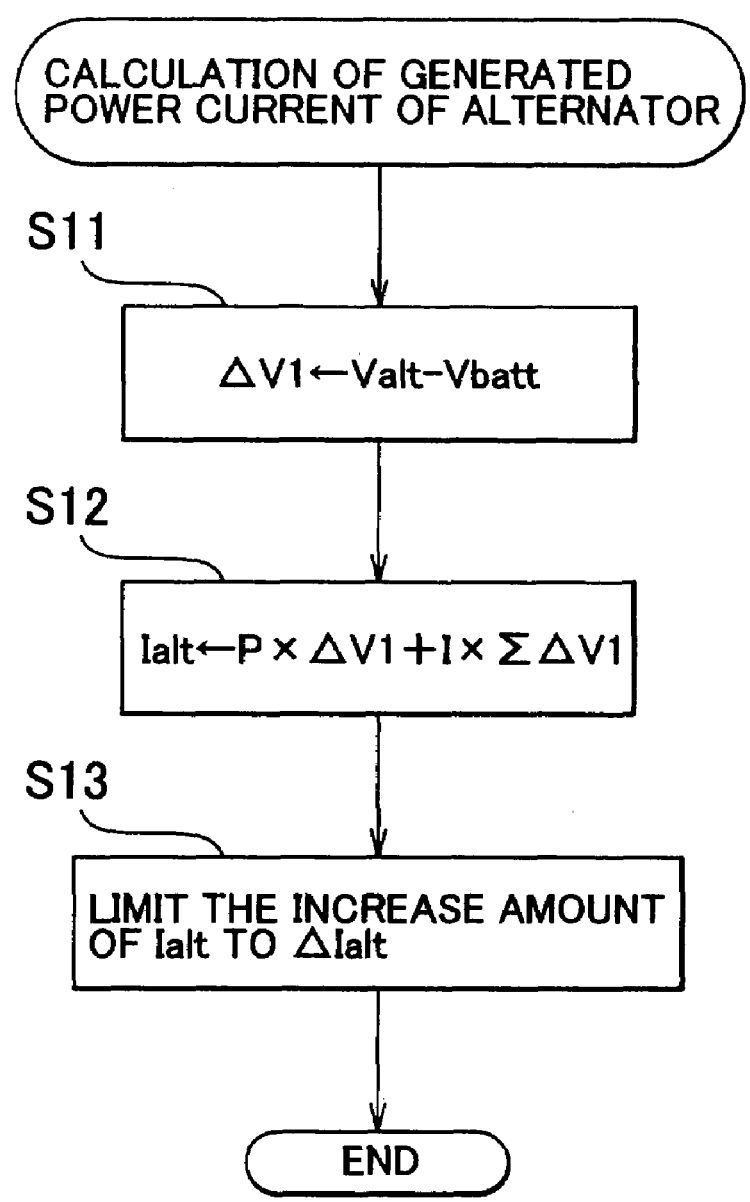
FIG. 2 is a flowchart of a procedure for calculating generated power current of an alternator in the control performed by the control system according to an exemplary embodiment of the invention.

FIG. 2 is a flowchart of a procedure for calculating generated power current of the alternator 5. In this procedure, a voltage difference $\Delta V1$ between the target generated power voltage Valt and a present battery voltage Vbatt is first determined (step S11). As described above, the target generated power voltage Valt of the alternator 5 is set to a voltage lower than the target charging voltage Vtg by the predetermined value α when power regeneration is being performed, and is set equal to the target charging voltage Vtg when power regeneration is not being performed. Thus, when the battery 6 is fully charged, the voltage difference $\Delta V1$ calculated in the step S11 is zero or a negative value.

Next, a generated power current control value Ialt of the alternator 5 is calculated using the voltage difference $\Delta V1$ determined in the step S11 (step S2). Here, the generated power current of the alternator 5 is controlled using a so-called proportional integration method, and the generated power current control value Ialt is calculated by summing a product of a coefficient P as a proportional term and the voltage difference $\Delta V1$ ($P \times \Delta V1$) and a product of a coefficient I as an integral term and an accumulated voltage difference $\Sigma \Delta V1$ ($I \times \Sigma \Delta V1$).

Subsequently, the increase amount of the calculated generated current control value Ialt is limited to a predetermined value $\Delta$Ialt1 (step S13). Thus, a sharp increase in the amount of generated power is avoided when power is being generated by the alternator 5.

FIG. 3 is a flowchart of a procedure for determining an output current of the DC-DC converter 10 which constitutes the second power generating power supply portion. In this procedure, a voltage difference $\Delta V2$ between the target voltage Vdcdc of the DC-DC converter 10 determined in the procedure shown in FIG. 1 and the present battery voltage Vbatt is first determined (step S21). As described above, the target voltage Vdcdc of the DC-DC converter 10 is set equal to the target charging voltage Vtg of the battery 6 when power regeneration is being performed. Therefore, the voltage difference $\Delta V2$ is a positive value when the battery 6 is not fully charged. When the battery 6 is fully charged or a power regeneration is not being performed, conversely, the voltage difference $\Delta V2$ is zero or a negative value.

Next, a current control value Idcdc is calculated using the voltage difference $\Delta V2$ determined in the step S21 (step S22). Here, the current of the DC-DC converter 10 is controlled also using the proportional integration method, and the current control value Idcdc of the DC-DC converter 10 is calculated by summing a product ($P \times \Delta V2$) of a coefficient P as a proportional term and the voltage difference $\Delta V2$ and a product ($I \times \Sigma \Delta V2$) of a coefficient I as an integral term and an accumulated voltage difference $\Sigma \Delta V2$.

Figure 4:
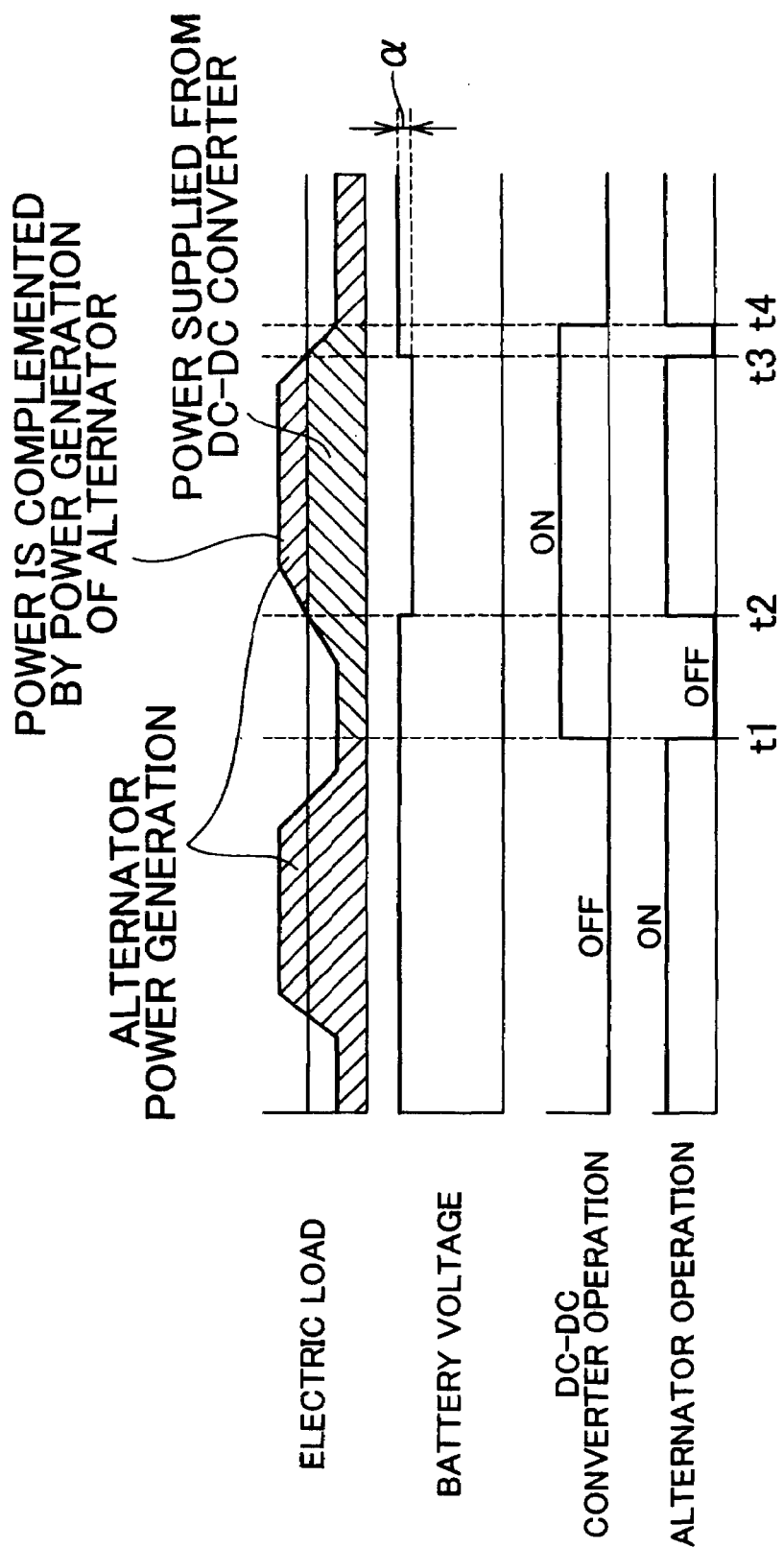
FIG. 4 is a timechart schematically showing how an electric load provided by auxiliaries, battery voltage, and the operating state of the DC-DC converter and alternator change when executing the procedures shown in FIGS. 1 to 3.

FIG. 4 is a timechart showing changes in the electric load provided by the auxiliaries, battery voltage, and the operation of the DC-DC converter 10 and alternator 5. Referring to FIG. 4, when power regeneration is not being performed (i.e., when "NO" is obtained in the step S1 of FIG. 1), the target voltage Vdcdc of the DC-DC converter 10 is set to zero and the DC-DC converter 10 is brought into an OFF state. At this time, no power is output from the capacitor 9 via the DC-DC converter 10.

In this state, the target generated power voltage Valt of the alternator 5 is, on the other hand, set equal to the target charging voltage Vtg so that the voltage of the battery 6 is maintained at the target voltage in its fully-charged state. At this time, therefore, power is supplied to the electric load 7 from the first power generating power supply portion constituted by the alternator 5 and battery 6.

When power regeneration begins while the DC-DC converter 10 is operating with an output level lower than its rated output (at a time point t1 of FIG. 4), "YES" is obtained in the step S1 of FIG. 1. In this case, the target voltage Vdcdc of the DC-DC converter 10 is set equal to the target charging voltage Vtg and the target generated power voltage Valt of the alternator 5 is set to voltage that is lower than the target charging voltage Vtg by the predetermined value $\alpha$. As a result, power is supplied to the battery 6 and auxiliaries (electric load) 7 from the DC-DC converter 10 so that the voltage of the battery 6 is maintained at the target voltage in its fully-charged state. At this time, since it is not necessary to generate power using the alternator 5, the alternator 5 is brought into an OFF state.

However, when the required power level becomes higher than the rated output of the DC-DC converter 10 (at a time point t2 of FIG. 4) as the electric load increases with time, the battery 6 starts outputting power to compensate for the power shortage, which causes a reduction in the voltage of the battery 6. When the amount of reduction in that voltage has reached the predetermined value $\alpha$, the present battery voltage Vbatt of the battery 6 becomes lower than the target generated power voltage Valt of the alternator 5, thus producing the voltage difference $\Delta V1$. Then, the generated power current control value Ialt of the alternator 5 is determined in accordance with the produced voltage difference $\Delta V1$, namely the alternator 5 starts operating to generate power.

When the required power level becomes lower than the rated output of the DC-DC converter 10 as the electric load reduces with time (at a time point t3 of FIG. 4), the value of the voltage difference $\Delta V1$ between the target generated power voltage Valt of the alternator 5 and the present battery voltage Vbatt of the battery 6 becomes negative. At this time, the generated power current control value Ialt of the alternator 5 becomes zero, namely the alternator 5 is brought into the OFF state where it generates no power.

When the power regeneration stops as the running state of the vehicle (at a time point t4 of FIG. 4) changes with time, the target voltage Vdcdc of the DC-DC converter 10 becomes zero and the target generated power voltage Valt of the alternator 5 is set equal to the target charging voltage Vtg, so that the DC-DC converter 10 is brought into the OFF state while the alternator 5 is brought into an ON state to start generating power. Thus, the power supply is switched from the second power generating power supply portion to the first power generating power supply portion.

According to the above-described control, when sufficient regenerated power is available, the power generation by the alternator 5 is stopped and the regenerated power is supplied preferentially to the electric load or is used for charging the battery 6. In this way, a reduction in the fuel economy resulting from an excessive use of the alternator 5 can be prevented, and overcharging of the battery 6 and excessive power consumption by the electric load 7 can be avoided. In the meantime, when the regenerated power becomes insufficient, power is then supplied from the battery 6 or the alternator 5, in order to prevent power shortage at the electric load 7 or operation failures of the electric load 7 which may be caused by that power shortage.

Also, when the battery 6 is used for compensating for a power shortage as described above, it may cause a reduction in the battery voltage. However, the alternator 5 starts generating power when the reduction amount of the battery voltage reaches the predetermined value $\alpha$ (volts) which is so small that no changes are caused in the operation of the electric load 7. Thus, even when the regenerated power becomes insufficient, changes or failures in the operation of the electric load 7 can be avoided.

Figure 5:
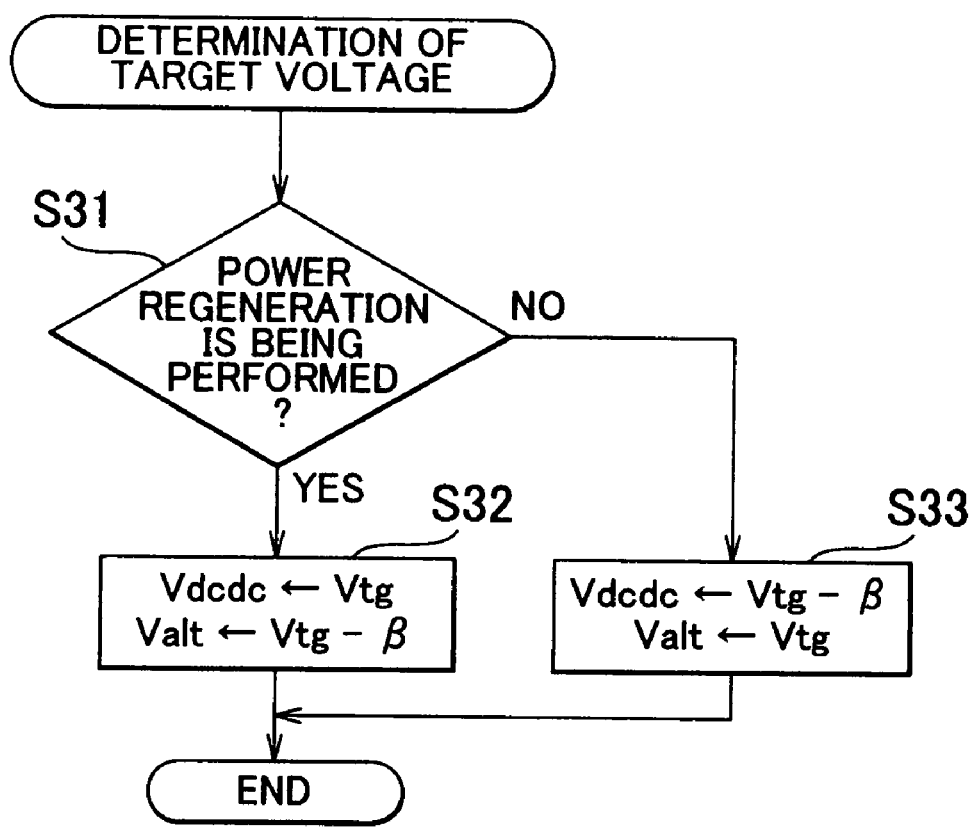
FIG. 5 is a flowchart of a procedure for determining target voltage for a power supply switching control.
Figure 6:
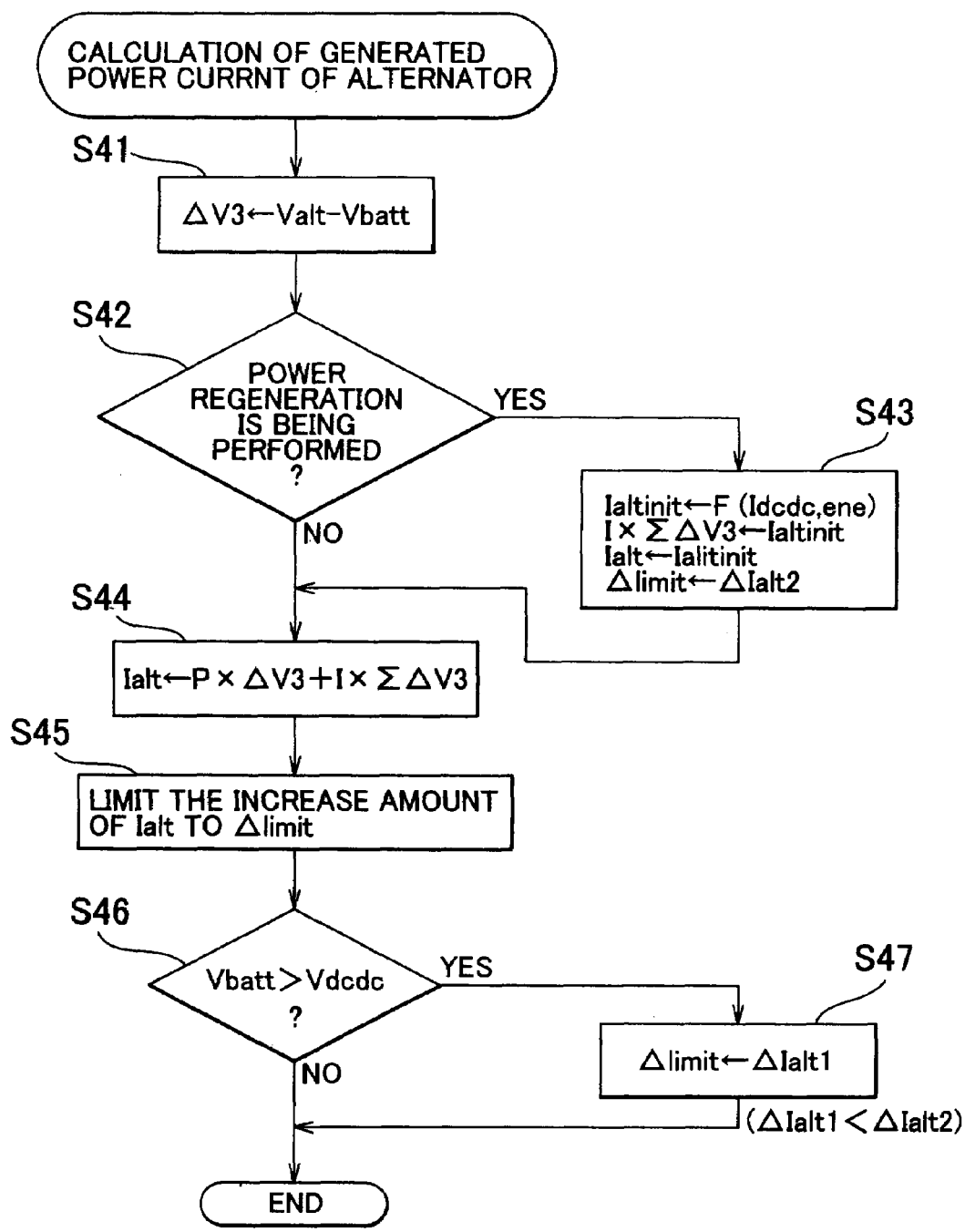
FIG. 6 is a flowchart of a procedure for calculating generated power current of the alternator in the power supply switching control.

The control system according to the invention switches the power supply as aforementioned. For example, the following control is performed for starting the power generation using the alternator 5 when power regeneration ends. FIGS. 5 and 6 show procedures executed in the control. More specifically, FIG. 5 shows a procedure for determining a target voltage of the DC-DC converter 10 and target generated power voltage Valt of the alternator 5. In this procedure, it is first determined whether power regeneration is being performed (step S31). This determination may be performed as in the step S1 described above.

When "YES" is obtained in the step S31, the target charging voltage Vtg of the battery 6 is set equal to the target voltage Vdcdc of the DC-DC converter 10 and the target generated power voltage Valt of the alternator 5 is set to voltage (Vtg$-\beta$) that is lower than the target charging voltage Vtg of the battery 6 by a predetermined value $\beta$ (step S32). This step corresponds to the step S2 of FIG. 1.

On the other hand, when the power regeneration stops as the running state of the vehicle changes and "NO" is obtained in the step S31, the target voltage Vdcdc of the DC-DC converter 10 is not set to zero immediately, but is set to voltage that is lower than the target charging voltage Vtg of the battery 6, and the target generated power voltage Valt of the alternator 5 is set equal to the target charging voltage Vtg (step S33). Namely, in this step, the target voltage Vdcdc of the DC-DC converter 10 and the target generated power voltage Valt of the alternator 5 are replaced with each other.

In the meantime, FIG. 6 shows a procedure for determining a generated power current of the alternator 5. In this procedure, a voltage difference $\Delta V3$ between the target generated power voltage Valt of the alternator 5 determined in the procedure shown in FIG. 5 and the present battery voltage Vbatt of the battery 6 is first determined (step S41). Subsequently, it is determined whether power regeneration is being performed (step S42).

When the power regeneration stops and "YES" is obtained in the step S42, an initial exciting current Ialtinit of the alternator 5 is determined using the current control value Idcdc of the DC-DC converter 10 and engine speed one (step S43). Here, the initial exciting current Ialtinit may be determined by calculation using a predetermined function or by using a map.

Then, the integral term (I$\times\Sigma\Delta V3$) used for determining the generated power current control value Ialt is set equal to the determined initial exciting current Ialtinit, and the generated power current control value Ialt is set equal to the initial exciting current Ialtinit, and a limit value $\Delta$limit for limiting the increase amount of the generated power current control value Ialt is set to a predetermined value $\Delta$Ialt2.

Here, the limit value Δlimit provides a change gradient of the generated power current control value Ialt of the alternator 5.

Subsequently, the generated power current control value Ialt of the alternator 5 is controlled using the same proportional integration method as in the step S12 of FIG. 12 and the step S22 of FIG. 3 (step S44). Once the power regeneration has stopped and the process in the step S43 has been implemented, "NO" is obtained in the step S42 from the next cycle. In this case, the control immediately proceeds to the step S44.

Next, the increase amount of the generated power current control value Ialt determined in the step S44 is limited to the limit value Δlimit (step S45). This process is implemented for setting a maximum gradient of the power to be generated by the alternator 5 and for controlling a change gradient of the torque to be applied to the alternator 5.

It is next determined whether the power generation by the alternator 5 has started (step S46). As described above, the alternator 5 starts supplying power to the battery 6 when the present battery voltage Vbatt of the battery 6 becomes higher than the target voltage Vdcdc of the DC-DC converter 10, therefore the power generation by the alternator 5 starts at this time. That is, the start of the power generation by the alternator 5 can be determined by comparing the present battery voltage Vbatt of the battery 6 and the target voltage Vdcdc of the DC-DC converter 10.

When the target voltage Vdcdc of the DC-DC converter 10 is higher than the present battery voltage Vbatt of the battery 6, namely when it is determined that the power generation by the alternator 5 has not started and "NO" is obtained in the step S46, the control proceeds as it is. When it is determined that the power generation by the alternator 5 has stared, namely "YES" is obtained in the step S46, conversely, the limit value Δlimit is set to a predetermined value ΔIalt1 that is smaller than the predetermined value ΔIalt2 determined in the step 43 (step S47).

That is, the power generation by the alternator 5 starts, an increase gradient of the generated power current control value Ialt is made steep so that the voltage sharply increases. At this time, since the alternator 5 is generating no power, the torque applied to the alternator 5 does not increase, and a squeaking noise is therefore not produced from a belt. In the meantime, after the power generation by the alternator 5 has started, the increase gradient of he Ialt is made less steep so that an increase gradient of the torque applied to the alternator 5 does not become steep, whereby the possibility for the belt to produce a squeaking noise can be eliminated or reduced. Moreover, since the voltage is already high at the time of starting the power generation by the alternator 5, a delay in increasing the amount of generated power can be suppressed or avoided.

Figure 7:
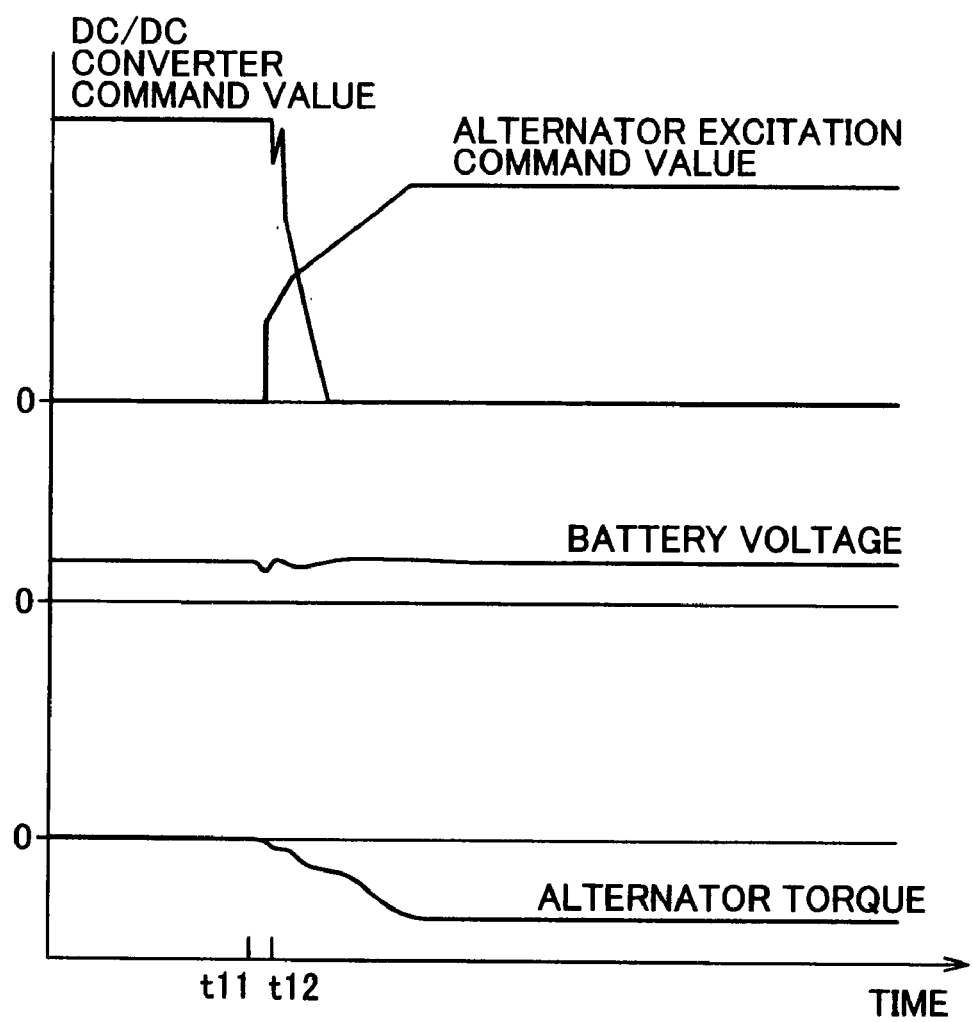
FIG. 7 is a timechart schematically showing how a current command value for the DC-DC converter, an excitation command value for the alternator, battery voltage, and toque applied to the alternator change when executing the procedures shown in FIGS. 5 and 6.

FIG. 7 is a timechart showing how a voltage command value for the DC-DC converter 10, excitation command value for the alternator 5, battery voltage, and torque applied to the alternator 5 change as the procedures shown in FIGS. 5 and 6 arc executed. Referring to FIG. 7, when power regeneration stops at a time point t11, the target voltage Vdcdc of the DC-DC converter 10 is reduced by the predetermined value β and the target generated power voltage Valt of the alternator 5 is set equal to the target charging voltage Vtg of the battery 6. Along with this change, the current command value for the DC-DC convener 10 is reduced by a predetermined amount, and the excitation command value for the alternator 5 is sharply increased to its initial value Ialtinit.

At this time, since the current command value of the DC-DC converter 10 is maintained at a certain value, the voltage of the battery 6 does not largely reduce. Thus, the torque applied to the alternator 5 does not shapely change, whereby a squeaking noise of the belt is avoided.

Afterwards, the excitation command value for the alternator 5 is sharply increased immediately before starting the power generation by the alternator 5. Here, an increase gradient of the excitation command value is steep. Then, when the alternator 5 starts generating power at a time point t12, the increase gradient of the excitation command value is made less steep. Thus, the excitation command value for the alternator 5 increases until it reaches the target value. During this, the voltage of the battery 6 is maintained at a substantially constant value and the torque applied to the alternator 5 gradually increases.

In the embodiment, as described above, the power supply can be switched while suppressing or preventing a transient reduction in the voltage, therefore changes or failures in the operation of the electric load 7, such as a reduction in the luminance of a light, can be prevented. Also, since the excitation command value for the alternator 5 is increased while maintaining the current command value for the DC-DC converter 10, namely the output thereof, at a relatively high value, the voltage is maintained high at the time of starting the power generation by the alternator 5. As a result, a transient reduction in the voltage can be prevented and a delay in the power generation using the alternator 5 is therefore suppressed or avoided. Furthermore, since the voltage is already high before the alternator 5 starts generating power by being driven by the engine 1, the change amount of the torque applied to the alternator 5 does not become large, whereby problems, such as a squeaking noise of the belt, which may cause an unpleasant feeling of the driver, can be prevented.

Hereinafter, a relationship between the elements of the above-described embodiment and those cited in the appended claims will be described. The battery 6 or the battery 6 and the electric load 7 corresponds to "a power receiving portion" in the claims. The functional processes of the steps S2, S3, S32, and S33 correspond to "voltage adjusting means" in the claims. The engine 1 corresponds to "a propelling force generating device" in the claims. The alternator 5 corresponds to "a first power generator" in the claims. The power regenerator 8 corresponds to "a second power generator" in the claims. The battery 6 corresponds to "power storage means" in the claims. The processes of the steps S33, S43 for increasing the excitation command value for the alternator 5 while maintaining the output voltage of the DC-DC converter 10 correspond to "switching means" in the claims. The functional process of the step S43 corresponds to "start-up means" in the claims. Here, note that the elements cited in the claims are not limited to the corresponding elements in the above-described embodiment.

It is to be understood that the invention is not limited to the above-described embodiment, but may be applied to a control system for controlling power supplies of a hybrid vehicle which includes an engine and motor generator as driving power sources, as well as a vehicle which performs an economy running operation by automatically stopping and restarting the engine operation. Therefore, the second power generating power supply portion in the invention may include such a motor generator which can also function a motor, instead of the power regenerator. While the invention has been employed as the control system for controlling two power supply portions in the above-described embodiment, the invention may be employed as a control system for controlling more than two power supply portions.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control system for a vehicle power supply which supplies power to a predetermined power receiving portion, comprising:
    a first power generating power supply portion that supplies power generated by at least one of an alternator and a battery;
    a second power generating power supply portion that supplies at least one of power generated by regenerative energy of a power generator and power from a capacitor; and
    a controller which sets a voltage to be output from one of the power generating power supply portions to a power receiving portion in accordance with an output voltage of the other of the power generating power supply portions, wherein the controller switches the power generating power supply portion for supplying power to the power receiving portion from the second power generating power supply portion to the first power generating power supply portion when a difference between the output voltage of the second power generating power supply portion and the voltage of the first power generating power supply portion is equal to or smaller than a predetermined value,
    wherein the controller maintains the output voltage of the second power generating power supply portion and starts up the first power generating power supply portion with an output voltage lower than the output voltage of the second power generating power supply portion while maintaining the output voltage of the second power generating power supply portion.

2. The control system according to claim 1, wherein the first power generating power supply portion is constructed so as to generate power by receiving a driving force from a propelling force generating device of the vehicle via a belt.

3. A control method of a control system for a vehicle power supply, which includes a first power generating power supply and a second power generating power supply and supplies power to a predetermined power receiving portion from the respective power generating power supply portions, the control method comprising the steps of:
    detecting an output voltage of the first power generating power supply portion that supplies power generated by at least one of an alternator and a battery;
    detecting an output voltage of the second power generating power supply portion that supplies at least one of power generated by regenerative energy of a power generator and power from a capacitor;
    setting a voltage to be output from one of the power generating power supply portions to the power receiving portion in accordance with an output voltage of the other of the power generating power supply portions;
    setting the output voltage of the first power generating power supply portion to a voltage that is lower than the voltage of the second power generating power supply portion by a first predetermined value; and
    switching the power generating power supply portion for supplying power to the power receiving portion from the second power generating power supply portion to the first power generating power supply portion when a difference between the output voltage of the second power generating power supply portion and the voltage of the first power generating power supply portion is equal to or smaller than a second predetermined value.

4. The control method according to claim 3, wherein the output voltage of the second power generating power supply portion is maintained and the first power generating power supply portion is started up with an output voltage lower than the output voltage of the second power generating power supply portion while the output voltage of the second power generating power supply portion is being maintained.

* * * * *